(12) United States Patent
Yang et al.

(10) Patent No.: US 11,952,283 B2
(45) Date of Patent: Apr. 9, 2024

(54) SILICON-AND GERMANIUM-BASED SCM-25 MOLECULAR SIEVE, PREPARATION PROCESS AND USE THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Weimin Yang, Shanghai (CN); Wenhua Fu, Shanghai (CN); Zhiqing Yuan, Shanghai (CN); Zhendong Wang, Shanghai (CN); Jiawei Teng, Shanghai (CN); Weichuan Tao, Shanghai (CN); Shengli Zhao, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY SINOPEC, Shanghai (CN)

( * ) Notice: Subject to any disclaimer, the term of this patent is extended or adjusted under 35 U.S.C. 154(b) by 81 days.

(21) Appl. No.: 17/626,077

(22) PCT Filed: Jul. 9, 2020

(86) PCT No.: PCT/CN2020/100969
§ 371 (c)(1),
(2) Date: Jan. 10, 2022

(87) PCT Pub. No.: WO2021/004492
PCT Pub. Date: Jan. 14, 2021

(65) Prior Publication Data
US 2022/0250927 A1 Aug. 11, 2022

(30) Foreign Application Priority Data
Jul. 9, 2019 (CN) .......................... 201910612312.0

(51) Int. Cl.
*B01J 29/04* (2006.01)
*B01J 20/18* (2006.01)
*C01B 39/48* (2006.01)

(52) U.S. Cl.
CPC .............. *C01B 39/48* (2013.01); *B01J 20/18* (2013.01); *C01P 2002/72* (2013.01)

(58) Field of Classification Search
None
See application file for complete search history.

(56) References Cited

U.S. PATENT DOCUMENTS

| | | | |
|---|---|---|---|
| 6,896,869 B2 | 5/2005 | Corma et al. | |
| 7,074,385 B2 | 7/2006 | Harbuzaru et al. | |
| 2016/0243532 A1* | 8/2016 | Dusselier | C10G 50/00 |
| 2018/0207625 A1* | 7/2018 | Davis | B01J 29/047 |

FOREIGN PATENT DOCUMENTS

| | | |
|---|---|---|
| CN | 101489674 A | 7/2009 |
| CN | 104801338 A | 7/2015 |
| CN | 106673009 A | 5/2017 |
| CN | 106830004 A | 6/2017 |
| CN | 107635921 A | 1/2018 |
| CN | 108584975 A | 9/2018 |
| EP | 1454882 * | 9/2004 |
| EP | 1454882 A1 | 9/2004 |

OTHER PUBLICATIONS

Machine Translation of EP 1454882 (Year: 2004).*
Barrer, R.M. et al.; "Lowtemperature Crystal Growth of Alruminosilicates, and of Some Gallium and Germnium Analogues"; Hydrothermal Chemistry of the Silicates. Part VIII; 1959; pp. 195-208.
Li, Hailian et al.; "Transformation of Germanium Dioxide to Microporous Germanate 4-Connected Nets"; J.Am.Chem.Soc.; 1998; vol. 120, No. 40; pp. 10569-10570.
Tang, Liqiu et al.; "A zeolite family with chiral and achiral structures built fromthe same building layer"; Nature Materials; May 2008; vol. 7; pp. 381-385.

* cited by examiner

*Primary Examiner* — Sheng H Davis
(74) *Attorney, Agent, or Firm* — NKL Law; Allen Xue

(57) ABSTRACT

A silicon-and germanium-based molecular sieve has a framework chemical composition as represented by the formula "SiO2.1/nGeO2". The silicon/germanium molar ratio is $0.1 \leq n \leq 30$. The molecular sieve has a unique X-ray diffraction pattern. It can be used in adsorptive separation, ion exchange, and catalytic conversion of organic compounds.

19 Claims, 2 Drawing Sheets

SILICON-AND GERMANIUM-BASED SCM-25 MOLECULAR SIEVE, PREPARATION PROCESS AND USE THEREOF

TECHNICAL FIELD

The present invention relates to a SCM-25 molecular sieve, its synthesis process and its use.

BACKGROUND TECHNOLOGY

Zeolites, also known as molecular sieves are a kind of porous crystalline materials. There are 245 kinds of molecular sieves with known structures that have been discovered so far, and molecular sieves with new structures are still emerging. Due to the regular molecular size pore structure, strong acidity and high hydrothermal stability, molecular sieves are widely used in the fields of catalysis, adsorption, ion exchange and the like, and they play an irreplaceable role. The framework of a molecular sieve is typically made up of coordination tetrahedra ($TO_4$) connected by common vertices (typically oxygen atoms). For molecular sieves, the tetrahedra in the framework are mainly $SiO_4$ tetrahedra and $AlO_4$ tetrahedra. These two tetrahedra can be replaced by other tetrahedra to form molecular sieves or molecular sieve analogues with different framework structures. For example, $AlO_4$ tetrahedra can be replaced by $GaO_4$ or $ZnO_4$ tetrahedra, which together with $SiO_4$ tetrahedra form the framework of the heteroatomic molecular sieve. Moreover, Ge and Si have similar coordination properties, and can also form a tetrahedral coordination structure, and a large number of novel germanium-containing molecular sieve or molecular sieve-like structures can be formed through the connection of $GeO_4$ and $SiO_4$.

In 1959, Barrer et al. tried to introduce Ge element into the synthesis of molecular sieves for the first time, and prepared an aluminum germanate salt having a similar structure to A-type and X-type molecular sieves (J. Chem. Soc., 1959, 195-208). About 40 years later, Yaghi prepared for the first time a new structure of germanium-containing molecular sieve ASU-7 (J. Am. Chem. Soc. 1998, 120, 10569-10570). The framework structure of this molecular sieve is entirely composed of $GeO_4$ tetrahedra. Since then, many researchers have begun to try to synthesize a new structure of germanium-containing molecular sieves. Among them, the work of Professor Corma's research group at the Universidad Politcnica de Valencia in Spain has attracted the most attention. Several kinds of silicogermanate molecular sieves that have been deeply studied include UTL (U.S. Pat. No. 7,074,385), BEC (U.S. Pat. No. 6,896,869), STW (Nature Mater., 2008, 7, 381-385), and the like.

SUMMARY OF THE INVENTION

The present invention provides a silicon- and germanium-based molecular sieve and a synthesis process of said molecular sieve.

The technical schemes adopted by the present invention are as follows:

1. A molecular sieve having an X-ray diffraction pattern substantially as shown in the following table:

| $2\theta(°)$ |
| --- |
| $6.53 \pm 0.3$ |
| $7.05 \pm 0.3$ |
| $9.56 \pm 0.3$ |
| $10.77 \pm 0.3$ |
| $12.84 \pm 0.3$ |
| $18.80 \pm 0.3$ |
| $22.60 \pm 0.3$ | preferably, the X-ray diffraction pattern further comprises X-ray diffraction peaks substantially as shown in the following table:

| $2\theta(°)$ |
| --- |
| $7.81 \pm 0.3$ |
| $14.37 \pm 0.3$ |
| $14.76 \pm 0.3$ |
| $15.45 \pm 0.3$ |
| $16.35 \pm 0.3$ |
| $17.52 \pm 0.3$ |
| $19.79 \pm 0.3$ | more preferably, said X-ray diffraction pattern optionally further comprises X-ray diffraction peaks substantially as shown in the following table,

| $2\theta(°)$ |
| --- |
| $21.46 \pm 0.3$ |
| $22.04 \pm 0.3$ |
| $23.64 \pm 0.3$ |
| $24.54 \pm 0.3$ |
| $25.14 \pm 0.3$ |
| $26.11 \pm 0.3$ |

2. A molecular sieve having an X-ray diffraction pattern substantially as shown in the following table:

| $2\theta(°)$ | Interplanar spacing(Å) | Relative intensity $(I/I_0) \times 100$ |
| --- | --- | --- |
| $6.53 \pm 0.3$ | $13.53 \pm 0.40$ | m or s |
| $7.05 \pm 0.3$ | $12.53 \pm 0.35$ | vs |
| $9.56 \pm 0.3$ | $9.24 \pm 0.30$ | w or m |
| $10.77 \pm 0.3$ | $8.21 \pm 0.30$ | s |
| $12.84 \pm 0.3$ | $6.89 \pm 0.25$ | w or m |
| $18.80 \pm 0.3$ | $4.72 \pm 0.15$ | m or s |
| $22.60 \pm 0.3$ | $3.93 \pm 0.10$ | m or s | preferably, the X-ray diffraction pattern further comprises X-ray diffraction peaks substantially as shown in the following table:

| $2\theta(°)$ | Interplanar spacing(Å) | Relative intensity $(I/I_0) \times 100$ |
| --- | --- | --- |
| $7.81 \pm 0.3$ | $11.31 \pm 0.35$ | w |
| $14.37 \pm 0.3$ | $6.16 \pm 0.25$ | w |
| $14.76 \pm 0.3$ | $6.00 \pm 0.25$ | w |
| $15.45 \pm 0.3$ | $5.73 \pm 0.20$ | w |
| $16.35 \pm 0.3$ | $5.42 \pm 0.20$ | w |
| $17.52 \pm 0.3$ | $5.06 \pm 0.15$ | w |
| $19.79 \pm 0.3$ | $4.48 \pm 0.15$ | w | more preferably, said X-ray diffraction pattern optionally further comprises X-ray diffraction peaks substantially as shown in the following table,

| 2θ(°) | Interplanar spacing(Å) | Relative intensity (I/I$_0$) × 100 |
|---|---|---|
| 21.46 ± 0.3 | 4.14 ± 0.10 | w or m |
| 22.04 ± 0.3 | 4.03 ± 0.10 | w or m |
| 23.64 ± 0.3 | 3.76 ± 0.10 | m |
| 24.54 ± 0.3 | 3.62 ± 0.05 | m |
| 25.14 ± 0.3 | 3.54 ± 0.05 | m |
| 26.11 ± 0.3 | 3.41 ± 0.05 | w or m. |

3. A molecular sieve having an X-ray diffraction pattern substantially as shown in the following table:

| 2θ(°) |
|---|
| 6.53 ± 0.15 |
| 7.05 ± 0.15 |
| 9.56 ± 0.15 |
| 10.77 ± 0.15 |
| 12.84 ± 0.15 |
| 18.80 ± 0.15 |
| 22.60 ± 0.15 | preferably, the X-ray diffraction pattern further comprises X-ray diffraction peaks substantially as shown in the following table:

| 2θ(°) |
|---|
| 7.81 ± 0.15 |
| 14.37 ± 0.15 |
| 14.76 ± 0.15 |
| 15.45 ± 0.15 |
| 16.35 ± 0.15 |
| 17.52 ± 0.15 |
| 19.79 ± 0.15 | more preferably, said X-ray diffraction pattern optionally further comprises X-ray diffraction peaks substantially as shown in the following table,

| 2θ(°) |
|---|
| 21.46 ± 0.15 |
| 22.04 ± 0.15 |
| 23.64 ± 0.15 |
| 24.54 ± 0.15 |
| 25.14 ± 0.15 |
| 26.11 ± 0.15. |

4. A molecular sieve having an X-ray diffraction pattern substantially as shown in the following table:

| 2θ(°) | Relative intensity (I/I$_0$) × 100 |
|---|---|
| 6.53 ± 0.15 | m or s |
| 7.05 ± 0.15 | vs |
| 9.56 ± 0.15 | w or m |
| 10.77 ± 0.15 | s |
| 12.84 ± 0.15 | w or m |
| 18.80 ± 0.15 | m or s |
| 22.60 ± 0.15 | m or s | preferably, the X-ray diffraction pattern further comprises X-ray diffraction peaks substantially as shown in the following table:

| 2θ(°) | Relative intensity (I/I$_0$) × 100 |
|---|---|
| 7.81 ± 0.15 | w |
| 14.37 ± 0.15 | w |
| 14.76 ± 0.15 | w |
| 15.45 ± 0.15 | w |
| 16.35 ± 0.15 | w |
| 17.52 ± 0.15 | w |
| 19.79 ± 0.15 | w | more preferably, said X-ray diffraction pattern optionally further comprises X-ray diffraction peaks substantially as shown in the following table,

| 2θ(°) | Relative intensity (I/I$_0$) × 100 |
|---|---|
| 21.46 ± 0.15 | w or m |
| 22.04 ± 0.15 | w or m |
| 23.64 ± 0.15 | m |
| 24.54 ± 0.15 | m |
| 25.14 ± 0.15 | m |
| 26.11 ± 0.15 | w or m. |

5. A molecular sieve having an X-ray diffraction pattern substantially as shown in the following table:

| 2θ(°) |
|---|
| 6.995 ± 0.200 |
| 10.730 ± 0.200 |
| 22.515 ± 0.200 |
| 6.505 ± 0.200 |
| 18.755 ± 0.200 | preferably, the X-ray diffraction pattern further comprises X-ray diffraction peaks substantially as shown in the following table:

| 2θ(°) |
|---|
| 23.585 ± 0.200 |
| 24.470 ± 0.200 |
| 25.065 ± 0.200 |
| 21.980 ± 0.200 |
| 7.870 ± 0.200 |
| 9.560 ± 0.200 | more preferably, said X-ray diffraction pattern optionally further comprises X-ray diffraction peaks substantially as shown in the following table,

| 2θ(°) |
|---|
| 12.845 ± 0.200 |
| 14.320 ± 0.200 |
| 14.725 ± 0.200 |
| 15.380 ± 0.200 |
| 16.295 ± 0.200 |
| 17.490 ± 0.200 |
| 19.745 ± 0.200 |
| 21.400 ± 0.200 |
| 26.055 ± 0.200. |

6. A molecular sieve having an X-ray diffraction pattern substantially as shown in the following table:

| 2θ(°) | Relative intensity |
| --- | --- |
| 6.995 ± 0.200 | vs |
| 10.730 ± 0.200 | s |
| 22.515 ± 0.200 | s |
| 6.505 ± 0.200 | m or s |
| 18.755 ± 0.200 | m or s | preferably, the X-ray diffraction pattern further comprises X-ray diffraction peaks substantially as shown in the following table:

| 2θ(°) | Relative intensity |
| --- | --- |
| 23.585 ± 0.200 | m |
| 24.470 ± 0.200 | m |
| 25.065 ± 0.200 | m |
| 21.980 ± 0.200 | w or m |
| 7.870 ± 0.200 | w |
| 9.560 ± 0.200 | w | more preferably, said X-ray diffraction pattern optionally further comprises X-ray diffraction peaks substantially as shown in the following table,

| 2θ(°) | Relative intensity |
| --- | --- |
| 12.845 ± 0.200 | w |
| 14.320 ± 0.200 | w |
| 14.725 ± 0.200 | w |
| 15.380 ± 0.200 | w |
| 16.295 ± 0.200 | w |
| 17.490 ± 0.200 | w |
| 19.745 ± 0.200 | w |
| 21.400 ± 0.200 | w |
| 26.055 ± 0.200 | w. |

7. The molecular sieve according to any of the above technical solutions, wherein the molecular sieve is based on silicon and germanium.

8. The molecular sieve according to any of the above technical solutions, wherein there is no hysteresis loop in the N2 adsorption-desorption isotherm of the molecular sieve at a temperature of 77K.

9. The molecular sieve according to any of the above technical solutions, wherein the calcined form of the molecular sieve has a framework chemical composition as represented by the formula "$SiO_2 \cdot 1/n\, GeO_2$", wherein the silicon/germanium molar ratio is $0.1 \leq n \leq 30$, preferably $0.25 \leq n \leq 20$, more preferably $0.5 \leq n \leq 15$, more preferably $1 \leq n \leq 5$.

10. The molecular sieve according to any of the above technical solutions, wherein the molecular sieve in form of the synthesis state has a framework chemical composition as represented by the formula "$kF \cdot mQ \cdot SiO_2 \cdot 1/n GeO_2 \cdot pH_2O$", wherein the silicon/germanium molar ratio $0.1 \leq n \leq 30$, preferably $0.25 \leq n \leq 20$, more preferably $0.5 \leq n \leq 15$, more preferably $1 \leq n \leq 5$; $0.05 \leq k \leq 1.0$, preferably $0.05 \leq k \leq 0.5$, more preferably $0.1 \leq k \leq 0.5$, more preferably $0.1 \leq k \leq 0.4$; Q is an organic template agent, $0.01 \leq m \leq 1.0$, preferably $0.02 \leq m \leq 0.5$, more preferably $0.05 \leq m \leq 0.5$, more preferably $0.05 \leq m \leq 0.3$; said organic template agent is selected from quaternary ammonium forms containing 1,1,3,5-tetraalkyl piperidinium ion or represented by the following structural formula, preferably 1,1,3,5-tetramethyl piperidinium hydroxide;

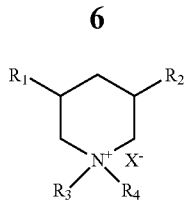

In the above formula, $R_1$-$R_4$ each independently are H or $C_{1-4}$ alkyl, preferably $C_{1-2}$ alkyl, more preferably —$CH_3$, $X^-$ is a halide ion (for example $Cl^-$, $Br^-$, and $I^-$) and a hydroxyl ion ($OH^-$), preferably a hydroxyl ion ($OH^-$); $0.005 \leq p \leq 0.5$, preferably $0.01 \leq p \leq 0.4$, more preferably $0.01 \leq p \leq 0.3$, more preferably $0.02 \leq p \leq 0.2$.

11. The molecular sieve according to any of the above technical solutions, wherein no more than 10% of Ge atoms in the molecular sieve are substituted with atoms of at least one element other than silicon and germanium.

12. The molecular sieve according to any of the above technical solutions, wherein said element(s) rather than silicon and germanium is at least one selected from a group consisting of boron, aluminum, gallium, titanium, zirconium, hafnium, tin, zinc, iron, chromium and indium, preferably at least one selected from a group consisting of aluminum and titanium.

13. A process for preparing a silicon- and germanium-based molecular sieve, which comprises a step of crystallizing a mixture containing a silicon source, a germanium source, a fluorine source, an organic template agent Q and water or formed from a silicon source, a germanium source, a fluorine source, an organic template agent Q and water to obtain the molecular sieve; and optionally a step of calcining said obtained molecular sieve;

wherein said organic template agent Q is selected from a quaternary ammonium form containing 1,1,3,5-tetraalkyl piperidinium ion or represented by the following structural formula, preferably 1,1,3,5-tetramethyl piperidinium hydroxide;

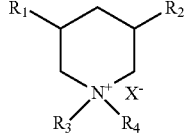

wherein $R_1$-$R_4$ each independently are H or $C_{1-4}$ alkyl, preferably $C_{1-2}$ alkyl, more preferably —$CH_3$, $X^-$ is a halide ion (for example $Cl^-$, $Br^-$ and $I^-$) and a hydroxyl ion ($OH^-$), preferably a hydroxyl ion ($OH^-$).

14. A process for preparing the molecular sieve according to any of the above technical solutions, wherein said silicon source is at least one selected from a group consisting of water glass, silica sol, solid silica gel, fumed silica, amorphous silica, diatomite, zeolite, and tetraethyl orthosilicate; said germanium source is at least one selected from a group consisting of germanium oxide, germanium nitrate and germanium tetraalkoxide (wherein alkoxide refers to $C_1$-$C_6$ alkoxide).

In the above-mentioned technical solution, the molar ratio of said organic template agent Q, said silicon source (as $SiO_2$), said germanium source (as $GeO_2$), said fluorine source (as F) and water is $Q:SiO_2:GeO_2:F:H_2O=0.15$-$4:1:0.033$-$10:0.2$-$4:0.5$-$50$, preferably $Q:SiO_2:GeO_2:F:H_2O=0.25$-$3.5:1:0.05$-$4:0.35$-$3.5:1$-$35$, more preferably Q:SiO$_2$:GeO$_2$:F:H$_2$O=0.3-2.5:1:0.067-2:0.4-2.5:1.5-25, more preferably Q:SiO$_2$:GeO$_2$:F:H$_2$O=0.35-1.5:1:0.2-1:0.45-2:2-15.

15. The process for preparing the molecular sieve according to any of the above technical solutions, wherein said fluorine source comprises at least one selected from a group consisting of hydrofluoric acid, ammonium fluoride, sodium fluoride, and potassium fluoride, preferably at least one selected from a group consisting of hydrofluoric acid and ammonium fluoride.

16. The process for preparing the molecular sieve according to any of the above technical solutions, wherein said crystallization condition comprises crystallizing at 100-200° C. for 30-400 hours; preferably crystallizing at 110-190° C. for 48-360 hours; more preferably crystallizing at 120-180° C. for 72-320 hours.

17. The process for preparing the molecular sieve according to any of the above technical solutions, wherein said mixture further comprises a source containing the element(s) rather than silicon and germanium, preferably at least one selected from a group consisting of boron source, aluminium source, gallium source, titanium source, zirconium source, hafnium source, tin source, zinc source, iron source, chromium source and indium source; more preferably at least one oxide source selected from a group consisting of boron oxide source, alumina source, gallium oxide source, titania source, zirconia source, hafnia source, tin oxide source, zinc oxide source, iron oxide source, chromic oxide source and indium oxide source; the molar ratio of said oxide source (as the corresponding oxide) to said germanium source (as GeO$_2$) is (0.01-0.1):1, preferably (0.015-0.08):1.

18. A molecular sieve composition, containing the molecular sieve according to any of the above technical solutions or the molecular sieve synthesized with the process for preparing the molecular sieve according to any of the above technical solutions, and a binder.

19. Use of a molecular sieve according to any of the above technical solutions, the molecular sieve synthesized with the process for preparing the molecular sieve according to any of the above technical solutions, or the molecular sieve composition according to any of the above technical solutions as adsorbent or catalyst.

According to the present invention, the involved silicon- and germanium-based molecular sieve have a framework structure that has never been obtained before in the art.

According to the present invention, the involved silicon- and germanium-based molecular sieve has a regular molecular dimension channel structure, relatively strong acidity, ion exchange performance and high thermal stability.

According to the present invention, the involved process for preparing the silicon- and germanium-based molecular sieve includes simple synthesis steps, has strong operability and broad synthesis field, and is convenient for popularization.

In one aspect of the present invention, the present invention also provides the following embodiments:

1. A molecular sieve SCM-25, wherein said SCM-25 molecular sieve has an X-ray diffraction pattern substantially as shown in the following table:

| 2θ(°) | Interplanar spacing (Å) | Relative intensity (I/I$_0$) × 100 |
|---|---|---|
| 6.53 ± 0.3 | 13.53 ± 0.40 | m-s |
| 7.05 ± 0.3 | 12.53 ± 0.35 | vs |
| 9.56 ± 0.3 | 9.24 ± 0.30 | w-m |
| 10.77 ± 0.3 | 8.21 ± 0.30 | s |

-continued

| 2θ(°) | Interplanar spacing (Å) | Relative intensity (I/I$_0$) × 100 |
|---|---|---|
| 12.84 ± 0.3 | 6.89 ± 0.25 | w-m |
| 18.80 ± 0.3 | 4.72 ± 0.15 | m-s |
| 22.60 ± 0.3 | 3.93 ± 0.10 | m-s |

2. The molecular sieve SCM-25 according to embodiment 1, which is characterized in that the X-ray diffraction pattern further comprises X-ray diffraction peaks substantially as shown in the following table:

| 2θ(°) | Interplanar spacing (Å) | Relative intensity (I/I$_0$) × 100 |
|---|---|---|
| 7.81 ± 0.3 | 11.31 ± 0.35 | w |
| 14.37 ± 0.3 | 6.16 ± 0.25 | w |
| 14.76 ± 0.3 | 6.00 ± 0.25 | w |
| 15.45 ± 0.3 | 5.73 ± 0.20 | w |
| 16.35 ± 0.3 | 5.42 ± 0.20 | w |
| 17.52 ± 0.3 | 5.06 ± 0.15 | w |
| 19.79 ± 0.3 | 4.48 ± 0.15 | w | said X-ray diffraction pattern optionally further comprises X-ray diffraction peaks substantially as shown in the following table,

| 2θ(°) | Interplanar spacing (Å) | Relative intensity (I/I$_0$) × 100 |
|---|---|---|
| 21.46 ± 0.3 | 4.14 ± 0.10 | w-m |
| 22.04 ± 0.3 | 4.03 ± 0.10 | w-m |
| 23.64 ± 0.3 | 3.76 ± 0.10 | m |
| 24.54 ± 0.3 | 3.62 ± 0.05 | m |
| 25.14 ± 0.3 | 3.54 ± 0.05 | m |
| 26.11 ± 0.3 | 3.41 ± 0.05 | w-m |

3. The molecular sieve SCM-25 according to embodiment 1, which is characterized in that the calcined form of the molecular sieve has a framework chemical composition as represented by the formula "SiO$_2$.1/nGeO$_2$", wherein the silicon/germanium molar ratio is 0.1≤n≤30, preferably 0.25≤n≤20, more preferably 0.5≤n≤15, more preferably 1≤n≤5.

4. The molecular sieve SCM-25 according to embodiment 1, which is characterized in that the molecular sieve in form of the synthesis state has a framework chemical composition as represented by the formula "kF.mQ.SiO$_2$.1/nGeO$_2$.pH$_2$O", wherein the silicon/germanium molar ratio is 0.1≤n≤30, preferably 0.25≤n≤20, more preferably 0.5≤n≤15, more preferably 1≤n≤5;

0.05≤k≤1.0, preferably 0.05≤k≤0.5, more preferably 0.1≤k≤0.5, more preferably 0.1≤k≤0.4;

Q is an organic template agent, 0.01≤m≤1.0, preferably 0.02≤m≤0.5, more preferably 0.05≤m≤0.5, more preferably 0.05≤m≤0.3; said organic template agent is selected from quaternary ammonium forms containing 1,1,3,5-tetraalkyl piperidinium ion or represented by the following structural formula, preferably 1,1,3,5-tetramethyl piperidinium hydroxide;

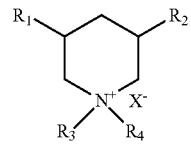

in the above formula, $R_1$-$R_4$ each independently are H or $C_{1-4}$ alkyl, preferably $C_{1-2}$ alkyl, more preferably —$CH_3$, $X^-$ is a halide ion (for example $Cl^-$, $Br^-$ and $I^-$) and a hydroxyl ion ($OH^-$), preferably a hydroxyl ion ($OH^-$);

0.005≤p≤0.5, preferably 0.01≤p≤0.4, more preferably 0.01≤p≤0.3, more preferably 0.02≤p≤0.2.

5. The molecular sieve SCM-25 according to embodiment 1, which is characterized in that no more than 10% of Ge atoms in the molecular sieve are substituted with atoms of at least one element other than silicon and germanium.

6. The molecular sieve SCM-25 according to embodiment 5, which is characterized in that said element(s) rather than silicon and germanium is at least one selected from a group consisting of boron, aluminum, gallium, titanium, zirconium, hafnium, tin, zinc, iron, chromium and indium, preferably at least one selected from a group consisting of aluminum and titanium.

7. A process for preparing the SCM-25 molecular sieve, which comprises a step of crystallizing a mixture containing a silicon source, a germanium source, a fluorine source, an organic template agent Q and water or formed from a silicon source, a germanium source, a fluorine source, an organic template agent Q and water to obtain the molecular sieve; and optionally, a step of calcining said obtained molecular sieve;

wherein said organic template agent Q is selected from a quaternary ammonium form containing 1,1,3,5-tetraalkyl piperidinium ion or represented by the following structural formula, preferably 1,1,3,5-tetramethyl piperidinium hydroxide;

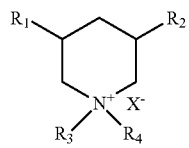

wherein $R_1$-$R_4$ each independently are H or $C_{1-4}$ alkyl, preferably $C_{1-2}$ alkyl, more preferably —$CH_3$, $X^-$ is a halide ion (for example $Cl^-$, $Br^-$ and $I^-$) and a hydroxyl ion ($OH^-$), preferably a hydroxyl ion ($OH^-$).

8. The synthesis process of the molecular sieve SCM-25 according to embodiment 7, which is characterized in that said silicon source is at least one selected from a group consisting of water glass, silica sol, solid silica gel, fumed silica, amorphous silica, diatomite, zeolite molecular sieve, and tetraethyl orthosilicate;

said germanium source is at least one selected from a group consisting of germanium oxide, germanium nitrate and germanium tetraalkoxide;

the molar ratio of said organic template agent Q, said silicon source (as $SiO_2$), said germanium source (as $GeO_2$), said fluorine source (as F) and water is Q:$SiO_2$:$GeO_2$:F:$H_2O$=0.15-4:1:0.033-10:0.2-4:0.5-50, preferably Q:$SiO_2$:$GeO_2$:F:$H_2O$=0.25-3.5:1:0.05-4:0.35-3.5:1-35, more preferably Q:$SiO_2$:$GeO_2$:F:$H_2O$=0.3-2.5:1:0.067-2:0.4-2.5:1.5-25, more preferably Q:$SiO_2$:$GeO_2$:F:$H_2O$=0.35-1.5:1:0.2-1:0.45-2:2-15.

9. The synthesis process of the molecular sieve SCM-25 according to embodiment 7, which is characterized in that said fluorine source comprises at least one selected from a group consisting of hydrofluoric acid, ammonium fluoride, sodium fluoride, and potassium fluoride, preferably at least one selected from a group consisting of hydrofluoric acid and ammonium fluoride.

10. The synthesis process of the SCM-25 molecular sieve according to embodiment 7, which is characterized in that said crystallization condition comprises crystallizing at 100-200° C. for 30-400 hours; preferably crystallizing at 110-190° C. for 48-360 hours; more preferably crystallizing at 120-180° C. for 72-320 hours.

11. The synthesis process of the molecular sieve SCM-25 according to embodiment 7, which is characterized in that said mixture further comprises a source containing the element(s) rather than silicon and germanium, preferably at least one selected from a group consisting of boron source, aluminium source, gallium source, titanium source, zirconium source, hafnium source, tin source, zinc source, iron source, chromium source and indium source; more preferably at least one oxide source selected from a group consisting of boron oxide source, alumina source, gallium oxide source, titania source, zirconia source, hafnia source, tin oxide source, zinc oxide source, iron oxide source, chromic oxide source and indium oxide source;

the molar ratio of said oxide source (as the corresponding oxide) to said germanium source (as $GeO_2$) is (0.01-0.1):1, preferably (0.015-0.08): 1.

12. A molecular sieve composition, containing the molecular sieve SCM-25 according to any of embodiments 1-6 or the molecular sieve SCM-25 prepared with the synthesis process of the molecular sieve SCM-25 according to any of embodiments 7-11, and a binder.

13. Use of the molecular sieve SCM-25 according to any of embodiments 1-6, the molecular sieve SCM-25 prepared with the synthesis process of the molecular sieve SCM-25 according to any of embodiments 7-11, or the molecular sieve composition according to embodiment 12 as adsorbent or catalyst.

DETAILED DESCRIPTION

Figure 1:
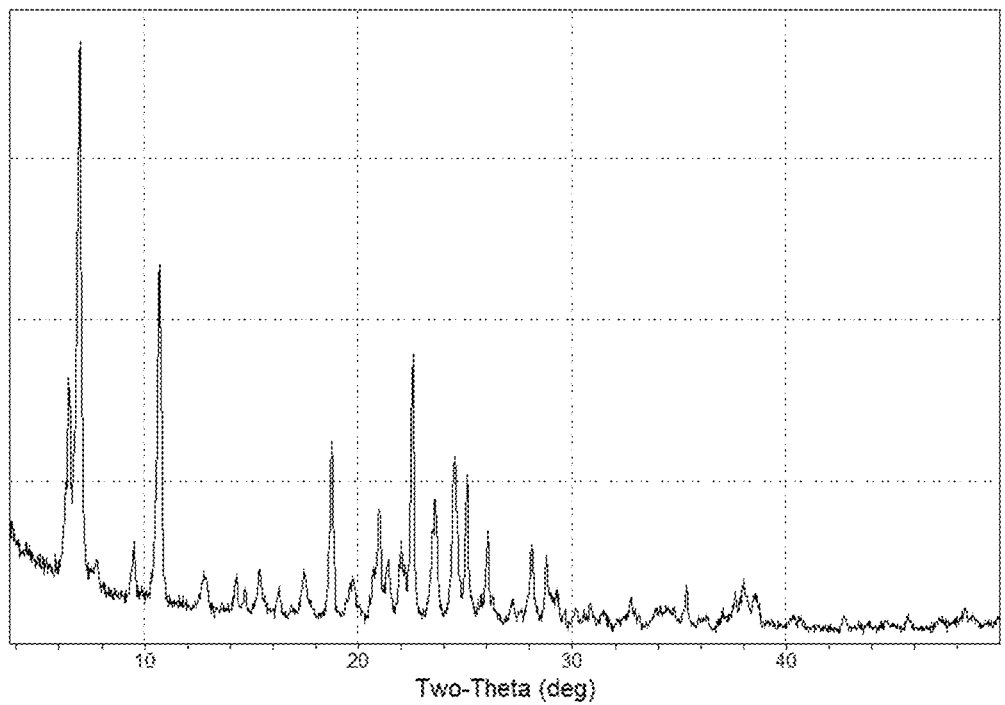
FIG. 1 is an X-ray diffraction (XRD) pattern of a sample before calcining obtained in Example 1.

In order to facilitate the understanding of the present invention, the examples of the present invention are provided as follows. However, those skilled in the art should understand that the examples are only to help understand the present invention, and should not be regarded as specific limitations to the present invention. The end points of the ranges and any values disclosed herein are not limited to the precise ranges or values, and these ranges or values should be understood to include the values close to these ranges or values.

All publications, patent applications, patents, and other references mentioned in this specification are herein incorporated by reference in their entirety. Unless otherwise defined, all technical and scientific terms used in this specification have the meanings commonly understood by those skilled in the art. In case of conflict, the present specification, including definitions, will control.

In the context of the present specification, the silicon- and germanium-based molecular sieve of the present invention is sometimes also referred to as the molecular sieve of the present invention, or the SCM-25 molecular sieve, or the silicon- and germanium-based SCM-25 molecular sieve.

In the context of the present specification, the expression "the molecular sieve is based on silicon and germanium" or similar expressions means that the framework of the molecular sieve contains silicon and germanium. In a special case, this kind of expression can mean that the framework of the molecular sieve is only composed of silicon and germanium.

In the context of the present specification, the expression "no more than 10% of Ge atoms in the molecular sieve are substituted with atoms of at least one element other than silicon and germanium" or similar expressions means that the Ge atoms in the framework of the molecular sieve are substituted with atoms of at least one element other than silicon and germanium, and this substitution element occupies the position of the substituted Ge atom. In the context of the present specification, the so-called specific surface area refers to the total area per unit mass of the sample, including the internal surface area and the external surface area. Non-porous samples have only the external surface area, e.g. Portland cement, some clay mineral powders, and the like; preforated and porous samples have the external surface area and the internal surface area, e.g. asbestos fiber, diatomite, and molecular sieves, and the like. The surface area of pores with the pore diameter of less than 2 nm of preforated and porous samples is the internal surface area, the surface area after deducting the internal surface area is called the external surface area, and the external surface area per unit mass of the sample is the external specific surface area.

In the context of the present specification, the so-called pore volume refers to the volume of pores per unit mass of the porous material. The so-called total pore volume refers to the volume of all pores per unit mass of the molecular sieve (generally only the pores with the pore diameter less than 50 nm are included). The so-called micropore volume refers to the volume of all micropores (generally the pores with the pore diameter of less than 2 nm) per unit mass of the molecular sieve.

In the context of the present specification, in the XRD data of the molecular sieves, w, m, s, and vs represent the intensity of diffraction peaks, w is weak, m is medium, s is strong, and vs is very strong, as well-known by those skilled in the art. Generally speaking, w is less than 20%; m is 20%-40% (not including 40%); s is 40%-70%; vs is greater than 70%, where the percentages are relative to the highest peak in the XRD pattern, that is, the intensity of the highest peak in the XRD pattern is defined as 100%.

In the context of the present specification, the structure of the molecular sieve is determined with the X-ray diffraction (XRD) pattern, the X-ray diffraction (XRD) pattern of the molecular sieve is measured with an X-ray powder diffractometer by using Cu—K α-ray source, Kα1 wavelength λ=1.5405980 angstroms (Å), and a nickel filter.

It should be particularly noted that two or more aspects (or embodiments) disclosed in the context of this specification can be combined with each other arbitrarily, and the technical solutions (such as processes or systems) formed thereby belong to a part of the original disclosure of this specification, and also falls within the protection scope of the present invention.

In the absence of an explicit indication, all percentages, parts, ratios and the like mentioned in this specification are based on the weight, unless the basis on the weight is not consistent with the conventional knowledge of those skilled in the art.

According to one aspect of the present invention, it relates to a silicon- and germanium-based molecular sieve, having an X-ray diffraction pattern substantially as shown in the following table:

| $2\theta(°)$ | Interplanar spacing (Å) | Relative intensity $(I/I_0) \times 100$ |
| --- | --- | --- |
| 6.53 ± 0.3 | 13.53 ± 0.40 | m or s |
| 7.05 ± 0.3 | 12.53 ± 0.35 | vs |
| 9.56 ± 0.3 | 9.24 ± 0.30 | w or m |
| 10.77 ± 0.3 | 8.21 ± 0.30 | s |
| 12.84 ± 0.3 | 6.89 ± 0.25 | w or m |
| 18.80 ± 0.3 | 4.72 ± 0.15 | m or s |
| 22.60 ± 0.3 | 3.93 ± 0.10 | m or s |

According to one aspect of the present invention, the X-ray diffraction pattern also comprises the X-ray diffraction peaks substantially as shown in the following table:

| $2\theta(°)$ | Interplanar spacing (Å) | Relative intensity $(I/I_0) \times 100$ |
| --- | --- | --- |
| 7.81 ± 0.3 | 11.31 ± 0.35 | w |
| 14.37 ± 0.3 | 6.16 ± 0.25 | w |
| 14.76 ± 0.3 | 6.00 ± 0.25 | w |
| 15.45 ± 0.3 | 5.73 ± 0.20 | w |
| 16.35 ± 0.3 | 5.42 ± 0.20 | w |
| 17.52 ± 0.3 | 5.06 ± 0.15 | w |
| 19.79 ± 0.3 | 4.48 ± 0.15 | w |

According to one aspect of the present invention, said X-ray diffraction pattern optionally further comprises X-ray diffraction peaks substantially as shown in the following table,

| $2\theta(°)$ | Interplanar spacing (Å) | Relative intensity $(I/I_0) \times 100$ |
| --- | --- | --- |
| 21.46 ± 0.3 | 4.14 ± 0.10 | w or m |
| 22.04 ± 0.3 | 4.03 ± 0.10 | w or m |
| 23.64 ± 0.3 | 3.76 ± 0.10 | m |
| 24.54 ± 0.3 | 3.62 ± 0.05 | m |
| 25.14 ± 0.3 | 3.54 ± 0.05 | m |
| 26.11 ± 0.3 | 3.41 ± 0.05 | w or m |

According to one aspect of the present invention, the molecular sieve of the present invention has a framework chemical composition I as represented by the formula "$SiO_2 \cdot 1/nGeO_2$". It is known that molecular sieves sometimes (especially immediately after synthesis) contain a certain amount of water, but the present invention does not believe that it is necessary to limit the amount of water, because the presence or absence of water does not substantially affect the XRD pattern of the molecular sieve. In view of this, the framework chemical composition actually represents the anhydrous chemical composition of the molecular sieve. Moreover, it is obvious that the framework chemical composition I represents the framework chemical composition of the molecular sieve of the present invention.

According to one aspect of the present invention, in said framework chemical composition I, the silicon/germanium molar ratio is $0.1 \leq n \leq 30$, preferably $0.25 \leq n \leq 20$, more preferably $0.5 \leq n \leq 15$, more preferably $1 \leq n \leq 5$.

According to one aspect of the present invention, immediately after synthesis, the molecular sieve generally may further contain an organic matter (especially an organic template agent), water and the like, e.g., those filled in its pores. Therefore, the molecular sieve of the present invention may also have a framework chemical composition II as represented by the formula "kF.mQ.SiO$_2$.1/nGeO$_2$.pH$_2$O". Herein, by calcining the molecular sieve with the framework chemical composition II to remove any organic template agent and water present in its pores, the molecular sieve with the framework chemical composition I can be obtained. In addition, the calcining can be carried out in any manner conventionally known in the art. For example, the calcining temperature is generally 300° C.-750° C., preferably 400° C.-600° C., and the calcining time is generally 1 hour to 10 hours, preferably 3 hours to 6 hours. In addition, the calcining can be performed in an oxygen-containing atmosphere, such as air or oxygen atmosphere, and the calcining can also be performed in situ. In view of this, the framework chemical composition I is sometimes also referred to as the calcined framework chemical composition, and the framework chemical composition II is sometimes also referred to as the framework chemical composition in form of the synthesis state.

According to one aspect of the present invention, in said framework chemical composition II, the silicon/germanium molar ratio is $0.1 \le n \le 30$, preferably $0.25 \le n \le 20$, more preferably $0.5 \le n \le 15$, more preferably $1 \le n \le 5$.

According to one aspect of the present invention, in said framework chemical composition II, F is fluorine, $0.05 \le k \le 1.0$, preferably $0.05 \le k \le 0.5$, more preferably $0.1 \le k \le 0.5$, more preferably $0.1 \le k \le 0.4$.

According to one aspect of the present invention, in said framework chemical composition II, Q is an organic template agent, $0.01 \le m \le 1.0$, preferably $0.02 \le m \le 0.5$, more preferably $0.05 \le m \le 0.5$, more preferably $0.05 \le m \le 0.3$.

According to one aspect of the present invention, in said framework chemical composition II, said organic template agent is selected from quaternary ammonium forms containing 1,1,3,5-tetraalkyl piperidinium ion or represented by the following structural formula, preferably 1,1,3,5-tetramethyl piperidinium hydroxide. These organic template agents can be used alone or in combination of multiple organic template agents in the required ratio.

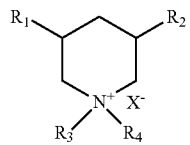

In the above formula, $R_1$-$R_4$ each independently are H or $C_{1-4}$ alkyl, preferably $C_{1-2}$ alkyl, more preferably —CH$_3$, X$^-$ is a halide ion (for example Cl$^-$, Br$^-$ and I$^-$) and a hydroxyl ion (OH$^-$), preferably a hydroxyl ion (OH$^-$);

According to one aspect of the present invention, in said framework chemical composition II, $0.005 \le p \le 0.5$, preferably $0.01 \le p \le 0.4$, more preferably $0.01 \le p \le 0.3$, more preferably $0.02 \le p \le 0.2$.

According to one aspect of the present invention, in the molecular sieve of the present invention, the framework germanium can be partially substituted with trivalent or tetravalent elements rather than silicon and germanium, and the substitution rate is not more than 10%. Herein, the parameter "substitution rate" is dimensionless. Said element (s) rather than silicon and germanium is at least one selected from a group consisting of boron, aluminum, gallium, titanium, zirconium, hafnium, tin, zinc, iron, chromium and indium, preferably at least one selected from a group consisting of aluminum and titanium. When germanium is substituted with trivalent element(s) such as trivalent boron, and trivalent aluminum, the substitution rate=2X$_2$O$_3$/(2X$_2$O$_3$+GeO$_2$)×100%, wherein X is a trivalent element; and when germanium is substituted with tetravalent element (s) such as tetravalent tin, tetravalent zirconium, and tetravalent titanium, the substitution rate=YO$_2$/(YO$_2$+GeO$_2$)×100%, wherein Y is a tetravalent element. When calculating the substitution rate, the mole of the corresponding oxide is used.

According to one aspect of the present invention, the specific surface area of the molecular sieve of the present invention (BET method) is 200-800 m$^2$/g, preferably 250-700 m$^2$/g.

According to one aspect of the present invention, the micropore volume (t-plot method) of the molecular sieve of the present invention is 0.1-0.35 cm$^3$/g, preferably 0.12-0.3 cm$^3$/g.

According to one aspect of the present invention, the molecular sieve of the present invention can be synthesized by the following process. In view of this, the present invention also relates to a process for preparing a silicon- and germanium-based molecular sieve, which comprises a step of crystallizing a mixture containing a silicon source, a germanium source, a fluorine source, an organic template agent Q and water or formed from a silicon source, a germanium source, a fluorine source, an organic template agent Q and water (hereinafter collectively referred to as the mixture) to obtain the molecular sieve.

According to one aspect of the present invention, in the preparation process of the molecular sieve, said organic template agent is selected from quaternary ammonium forms containing 1,1,3,5-tetraalkyl piperidinium ion or represented by the following structural formula, preferably 1,1,3,5-tetramethyl piperidinium hydroxide. These organic template agents can be used alone or in combination of multiple organic template agents in the required ratio.

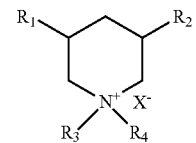

wherein $R_1$-$R_4$ each independently are H or $C_{1-4}$ alkyl, preferably $C_{1-2}$ alkyl, more preferably —CH$_3$, X$^-$ is a halide ion (for example Cl$^-$, Br$^-$ and I$^-$) and a hydroxyl ion (OH$^-$), preferably a hydroxyl ion (OH$^-$).

According to one aspect of the present invention, in the preparation process of the molecular sieve, the crystallization step can be carried out in any manner conventionally known in the art, for example, a process in which said silicon source, said germanium source, said fluorine source, said organic template agent and water are mixed in a predetermined ratio, and the resulting mixture is hydrothermally crystallized under the crystallization conditions, can be enumerated. The stirring can be optionally performed, as required.

According to one aspect of the present invention, in the preparation process of the molecular sieve, as the silicon source, any silicon source conventionally used in the art for this purpose can be used. For example, water glass, silica sol, solid silica gel, fumed silica, amorphous silica, diatomite, zeolite, tetraethyl orthosilicate, or the like can be enumerated. These silicon sources can be used alone or in combination of multiple silicon sources in a desired ratio.

According to one aspect of the present invention, in the preparation process of the molecular sieve, as the germanium source, any germanium source conventionally used in the art for this purpose can be used, including but not limited to germanium oxide, germanium nitrate and germanium tetraalkoxide, wherein the alkoxide refers to $C_1$-$C_6$ alkoxide.

According to one aspect of the present invention, in the preparation process of the molecular sieve, as the fluorine source, any fluorine source conventionally used in the art for this purpose can be used, for example, a fluoride or an aqueous solution thereof, such as hydrofluoric acid, ammonium fluoride, sodium fluoride, and potassium fluoride, especially hydrofluoric acid, can be enumerated.

According to one aspect of the present invention, in the preparation process of the molecular sieve, the molar ratio of said organic template agent Q, said silicon source (as $SiO_2$), said germanium source (as $GeO_2$), said fluorine source (as F) and water is Q:$SiO_2$:$GeO_2$:F:$H_2O$=0.15-4:1:0.033-10:0.2-4: 0.5-50, preferably Q:$SiO_2$:$GeO_2$:F:$H_2O$=0.25-3.5:1:0.05-4: 0.35-3.5:1-35, more preferably Q:$SiO_2$:$GeO_2$:F:$H_2O$=0.3-2.5:1:0.067-2:0.4-2.5:1.5-25, more preferably Q:$SiO_2$: $GeO_2$:F:$H_2O$=0.35-1.5:1:0.2-1:0.45-2:2-15.

According to one aspect of the present invention, in the preparation process of the molecular sieve, said crystallization condition comprises: crystallizing at 100-200° C. for 30-400 hours; preferably crystallizing at 110-190° C. for 48-360 hours; more preferably crystallizing at 120-185° C. for 72-320 hours, for example crystallizing at 120-180° C. for 72-320 hours.

According to one aspect of the present invention, in the preparation process of the molecular sieve, when trivalent or tetravalent elements rather than silicon and germanium are substituted for germanium atoms, it is necessary to add trivalent or tetravalent elements rather than silicon and germanium to the mixture, preferably an oxide source of trivalent or tetravalent elements rather than silicon and germanium. As said oxide source, it is preferably at least one oxide source selected from a group consisting of boron oxide source, alumina source, gallium oxide source, titania source, zirconia source, hafnia source, tin oxide source, zinc oxide source, iron oxide source, chromic oxide source and indium oxide source; as said alumina source, specifically for example, at least one selected from a group consisting of aluminium hydroxide, sodium aluminate, aluminium salt, kaolin and montmorillonite can be enumerated. As said boron oxide source, specifically for example, at least one selected from a group consisting of boron oxide, borax, sodium metaborate and boric acid can be enumerated. As said tin oxide source, specifically for example, at least one selected from a group consisting of tin tetrachloride, stannous chloride, tin alkyl, tin alkoxide and organotin acid ester (organic stannate ester) can be enumerated. As said zirconia source, specifically for example, at least one selected from a group consisting of zirconium salt (such as zirconium nitrate, and zirconium sulphate), zirconium alkyl, zirconium alkoxide and organic zirconate ester can be enumerated. As said titania source, specifically for example, one or more selected from tetraalkyl titanate (such as tetramethyl titanate, tetraethyl titanate, tetrapropyl titanate, and tetra-n-butyl titanate), $TiCl_4$, hexafluorotitanic acid, $Ti(SO_4)_2$ and hydrolysates thereof can be enumerated. As said gallium oxide source, specifically for example, at least one selected from a group consisting of gallium nitrate, gallium oxide, gallium halide (such as gallium chloride, gallium bromide), gallium sulphate, gallium isopropoxide, gallium acetate, and gallium ethoxide can be enumerated; as said hafnia source, specifically for example, at least one selected from a group consisting of hafnia, hafnium halide (such as hafnium chloride, and hafnium bromide), hafnium sulphate, hafnium tert-butoxide, hafnium oxychloride, and hafnium ethoxide can be enumerated; as said zinc oxide source, specifically for example, at least one selected from a group consisting of zinc oxide, zinc halide (such as zinc chloride), zinc acetate, basic zinc carbonate, zinc sulfate, zinc nitrate, zinc lactate, and zinc gluconate can be enumerated; as said iron oxide source, specifically for example, at least one selected from a group consisting of iron sulfate, iron nitrate, iron halides (such as iron trichloride), ferrocene, and iron citrate can be enumerated; as said chromic oxide source, specifically for example, at least one selected from a group consisting of chromic sesquioxide, chromium chloride, chromic nitrate, chromium acetate, and chromic potassium sulfate can be enumerated; and as said indium oxide source, specifically for example, at least one selected from a group consisting of indium oxide, indium sulfate, indium halides (such as indium trichloride), and indium acetate can be enumerated.

According to one aspect of the present invention, in the preparation process of the molecular sieve, when in use, the molar ratio of said oxide source (as the corresponding oxide) to said germanium source (as $GeO_2$) is generally (0.01-0.1): 1, preferably (0.015-0.08):1.

According to one aspect of the present invention, in the preparation process of the molecular sieve, after the crystallization is completed, the molecular sieve as product can be separated from the obtained reaction mixture with any conventionally known separation process, thereby obtaining the molecular sieve of the present invention, also known as the molecular sieve of the present invention in form of the synthesis state. As the separation process, for example, a process of filtering, washing and drying the obtained reaction mixture can be enumerated.

According to one aspect of the present invention, in the preparation process of the molecular sieve, the filtering, washing and drying can be carried out in any manner conventionally known in the art. Specifically as an example, as the filtering, for example, the obtained reaction mixture may be simply subjected to a suction filtering. As the washing, for example, the washing with deionized water can be enumerated. As the drying temperature, for example, 40-250° C., preferably 60-150° C. can be enumerated; and as the drying time, for example, 8-30 hours, preferably 10-20 hours can be enumerated. The drying can be performed under ordinary pressure or under reduced pressure.

According to one aspect of the present invention, in the preparation process of the molecular sieve, the molecular sieve obtained by crystallization can be calcined as required to remove the organic template agent, water that may be present and the like, thereby obtaining the calcined molecular sieve, also known as the calcined form of the molecular sieve of the present invention. The calcining can be carried out in any manner conventionally known in the art. For example, the calcining temperature is generally 300-800° C., preferably 400-650° C., and the calcining time is generally 1-10 hours, preferably 3-6 hours. In addition, the calcining can be performed in an oxygen-containing atmosphere, such as air or oxygen atmosphere, and the calcining can also be performed in situ. Preferably, the calcining is performed in situ.

According to one aspect of the present invention, the molecular sieve of the present invention can be in any physical form, for example in form of powder, granule or molded product (for example, strip-shaped, trefoil-shaped, and the like). These physical forms can be obtained in any manner conventionally known in the art, and are not particularly limited.

According to one aspect of the present invention, the molecular sieve of the present invention can be used in combination with other materials, thereby obtaining a molecular sieve composition. As these other materials, for example, active materials and inactive materials, can be enumerated. As said active material, for example, synthetic zeolite, natural zeolite and the like can be enumerated; and as said inactive material (generally referred to as binder), for example, clay, kaolin, silica gel, alumina and the like can be enumerated. These other materials can be used alone or in combination of multiple other materials in any ratio. As the used amount of said other materials, the conventional used amount in the art can be directly referred to, and there is no special limitation in this regard.

According to one aspect of the present invention, the molecular sieve or the molecular sieve composition of the present invention can be used as adsorbent, for example, to separate at least one component from a mixture of multiple components in the gas or liquid phase. Therefore, at least one component can be partially or substantially completely separated from a mixture of various components by contacting the mixture with the molecular sieve or the molecular sieve composition of the present invention to selectively adsorb this component.

According to one aspect of the present invention, the molecular sieve or the molecular sieve composition of the present invention can also be used as catalyst (or as catalytic active component) directly or after the treatment or conversion (e.g., ion exchange and the like) necessary for the molecular sieve conventionally performed in the art. To this end, according to one aspect of the present invention, for example, reactants (such as hydrocarbons) can be subjected to a predetermined reaction in the presence of the catalyst, and thereby the target product can be obtained.

With reference to the following specific examples, the present invention will be further described in detail, and the protection content of the present invention is not limited to the following examples.

Example 1

7 g of germanium oxide was dissolved in 76.8 g of an aqueous 1,1,3,5-TMPOH solution (20 wt %), and 27.8 g of tetraethyl orthosilicate (TEOS) was slowly added. The mixture was stirred at room temperature. After the completion of the hydrolysis, the vessel was opened and the stirring was carried out overnight to evaporate ethanol and a part of water. 5 g of hydrofluoric acid (40 wt %) was added, and the mixture was uniformly stirred and continued to evaporate a part of water until the reaction mixture reached the following molar composition:

0.5 (1,1,3,5-TMPOH):0.667 $SiO_2$:0.333 $GeO_2$:0.5 $HF$:7$H_2O$

Figure 2:
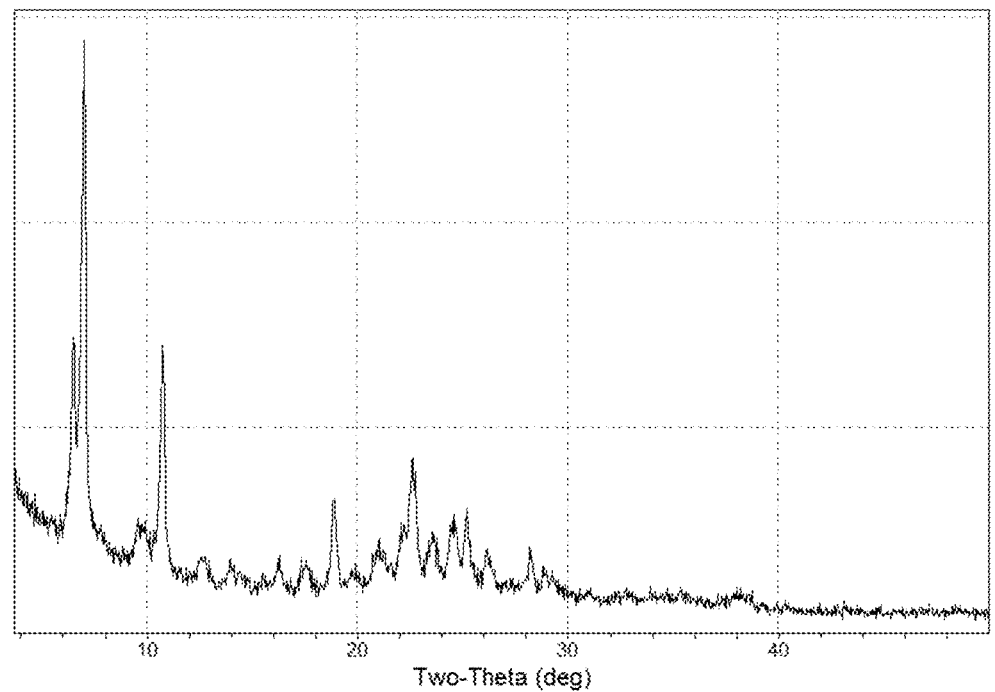
FIG. 2 is an X-ray diffraction (XRD) pattern of a sample after calcining obtained in Example 1.
Figure 3:
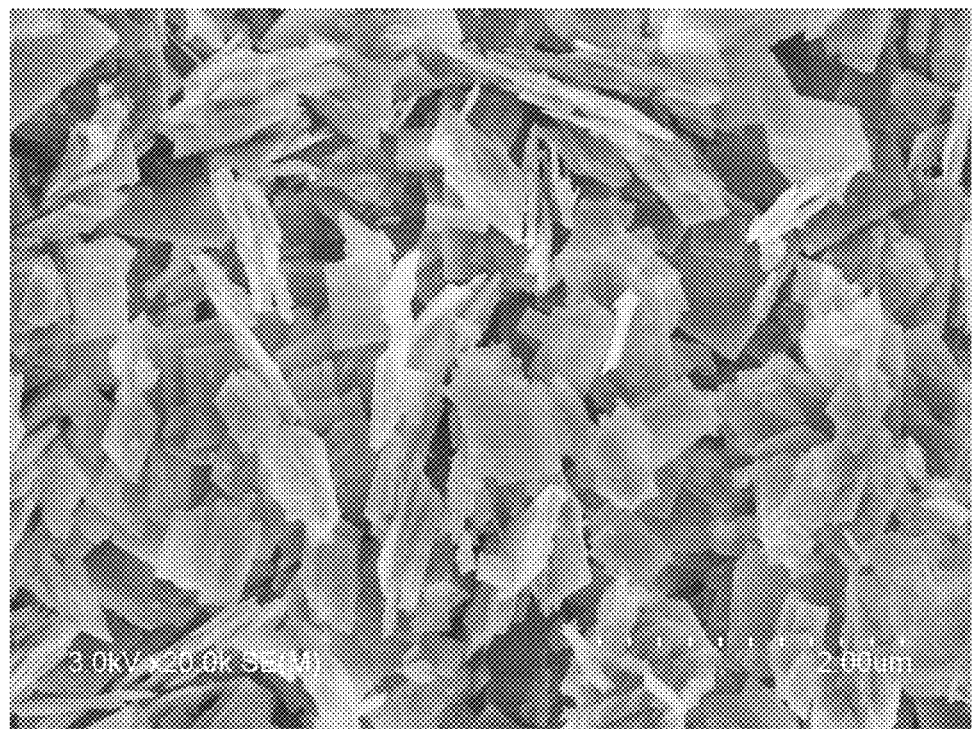
FIG. 3 is a scanning electron microscope (SEM) photograph of a sample obtained in Example 1.
Figure 4:
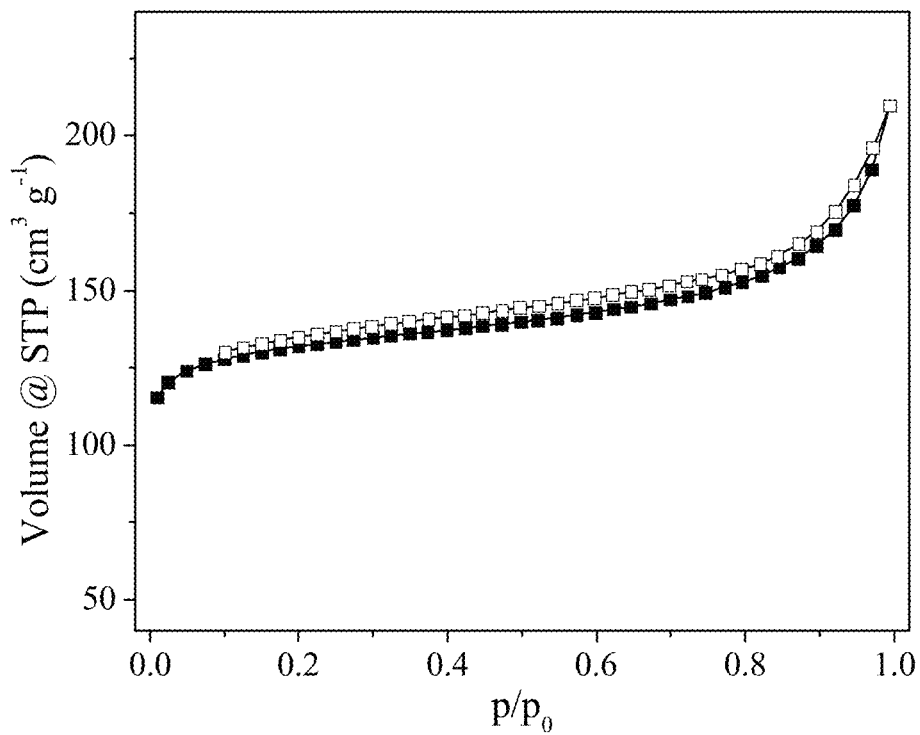
FIG. 4 is the N2 adsorption-desorption isotherm at 77K of a sample obtained in Example 1.

The above mixture was loaded into a teflon-lined crystallization autoclave, and crystallized in an oven at 170° C. for 288 hours. After the reaction, the solid was filtered, washed, dried and calcined in air to give a molecular sieve, and the obtained molecular sieve product has a specific surface area of 498 $m^2$/g, and a micropore volume of 0.18 $cm^3$/g. The XRD pattern of the sample before calcining was shown in FIG. 1, the XRD pattern after calcining was shown in FIG. 2, the scanning electron microscope photograph was shown in FIG. 3, and the Na adsorption-desorption isotherm at 77 K was shown in FIG. 4.

| 2θ(°) | Interplanar spacing (Å) | Relative intensity ($I/I_0$) × 100 |
|---|---|---|
| 6.53 | 13.53 | 35.7 |
| 7.05 | 12.53 | 100 |
| 7.81 | 11.31 | 3.3 |
| 9.56 | 9.24 | 10.1 |
| 10.77 | 8.21 | 62.3 |
| 12.84 | 6.89 | 6.7 |
| 14.37 | 6.16 | 6.7 |
| 14.76 | 6.00 | 5.1 |
| 15.45 | 5.73 | 7.6 |
| 16.35 | 5.42 | 5.4 |
| 17.52 | 5.06 | 8.7 |
| 18.80 | 4.72 | 32.3 |
| 19.79 | 4.48 | 7.1 |
| 21.46 | 4.14 | 9.2 |
| 22.04 | 4.03 | 13 |
| 22.60 | 3.93 | 48.2 |
| 23.64 | 3.76 | 21 |
| 24.54 | 3.62 | 28.8 |
| 25.14 | 3.54 | 25.5 |
| 26.11 | 3.41 | 16 |

The XRD pattern of the product after calcining in-situ was consistent with that in FIG. 1, and the characteristic data of the XRD pattern and the calculated interplanar spacing data were shown in the above table.

Example 2

4.2 g of germanium oxide was dissolved in 115 g of an aqueous 1,1,3,5-TMPOH solution (20 wt %), and 33.3 g of tetraethyl orthosilicate (TEOS) was slowly added. The mixture was stirred at room temperature. After the completion of the hydrolysis, the vessel was opened and the stirring was carried out overnight to evaporate ethanol and a part of water. 10 g of an ammonium fluoride solution (37 wt %) was added, and the mixture was uniformly stirred and continued to evaporate a part of water until the reaction mixture reached the following molar composition:

0.75 (1,1,3,5-TMPOH):0.8 $SiO_2$:0.2 $GeO_2$:0.5 $NH_4F$: 2.5$H_2O$

The above mixture was loaded into a teflon-lined crystallization autoclave, and crystallized in an oven at 160° C. for 240 hours. After the reaction, the solid was filtered, washed, dried and calcined in air to give a molecular sieve, the XRD pattern of which was similar to that in FIG. 2.

| 2θ(°) | Interplanar spacing (Å) | Relative intensity ($I/I_0$) × 100 |
|---|---|---|
| 6.46 | 13.68 | 36.3 |
| 6.96 | 12.69 | 100 |
| 7.76 | 11.39 | 5.4 |
| 9.50 | 9.30 | 8.9 |
| 10.70 | 8.26 | 53.7 |
| 12.80 | 6.91 | 4.7 |
| 14.26 | 6.20 | 6.3 |
| 14.67 | 6.03 | 1.8 |
| 15.32 | 5.78 | 7 |
| 16.26 | 5.45 | 4.4 |
| 17.46 | 5.08 | 5.6 |
| 18.73 | 4.73 | 30.1 |
| 19.73 | 4.50 | 5.5 |
| 21.32 | 4.16 | 5.9 |
| 21.97 | 4.04 | 14.7 |
| 22.50 | 3.95 | 47.6 |
| 23.54 | 3.78 | 25.7 |
| 24.47 | 3.63 | 22.1 |
| 25.04 | 3.55 | 23.6 |
| 25.99 | 3.43 | 11.9 |

The characteristic data of the XRD pattern of the product after calcining in-situ and the calculated interplanar spacing data were shown in the above table.

Example 3

10.5 g of germanium oxide was dissolved in 61.4 g of an aqueous 1,1,3,5-TMPOH solution (20 wt %), and 20.8 g of tetraethyl orthosilicate (TEOS) was slowly added. The mixture was stirred at room temperature. After the completion of the hydrolysis, the vessel was opened and the stirring was carried out overnight to evaporate ethanol and a part of water. 5 g of hydrofluoric acid (40 wt %) and 10 g of an ammonium fluoride solution (37 wt %) were added, and the mixture was uniformly stirred and continued to evaporate a part of water until the reaction mixture reached the following molar composition:

0.4 (1,1,3,5-TMPOH):0.5 $SiO_2$:0.5 $GeO_2$:0.5 HF:0.5 $NH_4F$:4.8$H_2O$

The above mixture was loaded into a teflon-lined crystallization autoclave, and crystallized in an oven at 175° C. for 216 hours. After the reaction, the solid was filtered, washed, dried and calcined in air to give a molecular sieve, the XRD pattern of which was similar to that in FIG. 2.

| 2θ(°) | Interplanar spacing (Å) | Relative intensity ($I/I_0$) × 100 |
| --- | --- | --- |
| 6.47 | 13.65 | 40.4 |
| 7.03 | 12.57 | 100 |
| 7.78 | 11.35 | 5.8 |
| 9.50 | 9.30 | 12.2 |
| 10.74 | 8.23 | 58.5 |
| 12.72 | 6.95 | 6.1 |
| 14.28 | 6.20 | 6.8 |
| 14.73 | 6.01 | 4.2 |
| 15.31 | 5.78 | 4.3 |
| 16.22 | 5.46 | 3.1 |
| 17.59 | 5.04 | 5.6 |
| 18.73 | 4.73 | 35.4 |
| 19.70 | 4.50 | 5.6 |
| 21.37 | 4.15 | 6.1 |
| 21.94 | 4.05 | 13.3 |
| 22.51 | 3.95 | 48.7 |
| 23.51 | 3.78 | 22.9 |
| 24.45 | 3.64 | 26.2 |
| 24.99 | 3.56 | 28.8 |
| 25.99 | 3.43 | 17.8 |

The characteristic data of the XRD pattern of the product after calcining in-situ and the calculated interplanar spacing data were shown in the above table.

Example 4

14 g of germanium oxide was dissolved in 153.6 g of an aqueous 1,1,3,5-TMPOH solution (20 wt %), and 13.9 g of tetraethyl orthosilicate (TEOS) was slowly added. The mixture was stirred at room temperature. After the completion of the hydrolysis, the vessel was opened and the stirring was carried out overnight to evaporate ethanol and a part of water. 12 g of hydrofluoric acid (40 wt %) was added, and the mixture was uniformly stirred and continued to evaporate a part of water until the reaction mixture reached the following molar composition:

1 (1,1,3,5-TMPOH):0.333 $SiO_2$:0.667 $GeO_2$:1.2 HF:13.5$H_2O$

The above mixture was loaded into a teflon-lined crystallization autoclave, and crystallized in an oven at 165° C. for 180 hours. After the reaction, the solid was filtered, washed, dried and calcined in air to give a molecular sieve, the XRD pattern of which was similar to that in FIG. 2.

| 2θ(°) | Interplanar spacing (Å) | Relative intensity ($I/I_0$) × 100 |
| --- | --- | --- |
| 6.46 | 13.68 | 36.5 |
| 6.95 | 12.71 | 100 |
| 7.75 | 11.40 | 3.6 |
| 9.67 | 9.14 | 19.5 |
| 10.67 | 8.29 | 58.5 |
| 12.74 | 6.94 | 5.1 |
| 14.25 | 6.21 | 6.2 |
| 14.66 | 6.04 | 3.7 |
| 15.34 | 5.77 | 6.8 |
| 16.20 | 5.47 | 2.9 |
| 17.42 | 5.09 | 5.5 |
| 18.69 | 4.74 | 27 |
| 19.72 | 4.50 | 7.2 |
| 21.33 | 4.16 | 6 |
| 22.06 | 4.03 | 21 |
| 22.43 | 3.96 | 45.2 |
| 23.52 | 3.78 | 20.1 |
| 24.43 | 3.64 | 20.6 |
| 25.00 | 3.56 | 23.2 |
| 25.97 | 3.43 | 13.2 |

The characteristic data of the XRD pattern of the product after calcining in-situ and the calculated interplanar spacing data were shown in the above table.

Example 5

3.5 g of germanium oxide was dissolved in 192 g of an aqueous 1,1,3,5-TMPOH solution (20 wt %), and 34.5 g of tetraethyl orthosilicate (TEOS) was slowly added. The mixture was stirred at room temperature. After the completion of the hydrolysis, the vessel was opened and the stirring was carried out overnight to evaporate ethanol and a part of water. 60 g of an ammonium fluoride solution (37 wt %) was added, and the mixture was uniformly stirred and continued to evaporate a part of water until the reaction mixture reached the following molar composition:

1.25 (1,1,2,5-TMPOH):0.833 $SiO_2$:0.167 $GeO_2$:3 $NH_4F$:22$H_2O$

The above mixture was loaded into a teflon-lined crystallization autoclave, and crystallized in an oven at 150° C. for 192 hours. After the reaction, the solid was filtered, washed, dried and calcined to give a molecular sieve, the XRD pattern of which was similar to that in FIG. 2.

| 2θ(°) | Interplanar spacing (Å) | Relative intensity ($I/I_0$) × 100 |
| --- | --- | --- |
| 6.59 | 13.41 | 36.1 |
| 7.06 | 12.52 | 100 |
| 7.89 | 11.20 | 4.6 |
| 9.60 | 9.21 | 10.3 |
| 10.77 | 8.21 | 55.6 |
| 12.84 | 6.89 | 7.7 |
| 14.38 | 6.16 | 5.9 |
| 14.79 | 5.98 | 4.9 |
| 15.42 | 5.74 | 8.1 |
| 16.31 | 5.43 | 3.7 |
| 17.51 | 5.06 | 7.5 |
| 18.79 | 4.72 | 27.9 |
| 19.78 | 4.48 | 8.8 |
| 21.48 | 4.13 | 7.1 |
| 22.00 | 4.04 | 13.4 |
| 22.56 | 3.94 | 46 |
| 23.60 | 3.77 | 21.2 |
| 24.51 | 3.63 | 31.6 |

-continued

| 2θ(°) | Interplanar spacing (Å) | Relative intensity (I/I₀) × 100 |
|---|---|---|
| 25.11 | 3.54 | 25.7 |
| 26.08 | 3.41 | 15.8 |

The characteristic data of the XRD pattern of the product after calcining in-situ and the calculated interplanar spacing data were shown in the above table.

Example 6

0.4 g of aluminium isopropoxide and 7 g of germanium oxide were dissolved in 76.8 g of an aqueous 1,1,3,5-TMPOH solution (20 wt %), and 27.8 g of tetraethyl orthosilicate (TEOS) was slowly added. The mixture was stirred at room temperature. After the completion of the hydrolysis, the vessel was opened and the stirring was carried out overnight to evaporate ethanol, propanol and a part of water. 10 g of hydrofluoric acid (40 wt %) was added, and the mixture was uniformly stirred and continued to evaporate a part of water until the reaction mixture reached the following molar composition:

0.5 (1,1,3,5-TMPOH):0.667 $SiO_2$:0.333 $GeO_2$:0.005 $Al_2O_3$:1 HF:5$H_2O$

The above mixture was loaded into a teflon-lined crystallization autoclave, and crystallized in an oven at 165° C. for 250 hours. After the reaction, the solid was filtered, washed, dried and calcined to give a solid, an aluminum-containing molecular sieve, the XRD pattern of which was similar to that in FIG. 2, and in the product, (Si+Ge)/Al=130.

| 2θ(°) | Interplanar spacing (Å) | Relative intensity (I/I₀) × 100 |
|---|---|---|
| 6.56 | 13.47 | 36.1 |
| 7.05 | 12.53 | 100 |
| 7.86 | 11.24 | 5 |
| 9.56 | 9.24 | 9 |
| 10.74 | 8.23 | 60.7 |
| 12.81 | 6.91 | 5.9 |
| 14.33 | 6.18 | 5 |
| 14.77 | 5.99 | 4.1 |
| 15.41 | 5.74 | 7.2 |
| 16.33 | 5.42 | 3.1 |
| 17.51 | 5.06 | 8.7 |
| 18.82 | 4.71 | 25.6 |
| 19.73 | 4.50 | 6.4 |
| 21.39 | 4.15 | 7.7 |
| 22.00 | 4.04 | 10.5 |
| 22.53 | 3.94 | 37.4 |
| 23.60 | 3.77 | 20.7 |
| 24.51 | 3.63 | 28.5 |
| 25.10 | 3.55 | 20.5 |
| 26.04 | 3.42 | 12.3 |

The characteristic data of the XRD pattern of the product after calcining in-situ and the calculated interplanar spacing data were shown in the above table.

Example 7

2 g of aluminium isopropoxide and 10.5 g of germanium oxide was dissolved in 76.8 g of an aqueous 1,1,3,5-TMPOH solution (20 wt %), and 20.8 g of tetraethyl orthosilicate (TEOS) was slowly added. After the completion of the hydrolysis, the vessel was opened and the stirring was carried out overnight to evaporate ethanol, propanol and a part of water. 10 g of hydrofluoric acid (40 wt %) and 10 g of an ammonium fluoride solution (37 wt %) were added, and the mixture was uniformly stirred and continued to evaporate a part of water until the reaction mixture reached the following molar composition:

0.5 (1,1,3,5-TMPOH):0.5 $SiO_2$:0.5 $GeO_2$:0.025 $Al_2O_3$:1 HF:0.5 $NH_4F$:8$H_2O$

The above mixture was loaded into a teflon-lined crystallization autoclave, and crystallized in an oven at 155° C. for 300 hours. After the reaction, the solid was filtered, washed, dried and calcined to give a solid, an aluminum-containing molecular sieve, the XRD pattern of which was similar to that in FIG. 2, and in the product, (Si+Ge)/Al=28.

| 2θ(°) | Interplanar spacing (Å) | Relative intensity (I/I₀) × 100 |
|---|---|---|
| 6.56 | 13.46 | 37.1 |
| 7.06 | 12.51 | 100 |
| 7.93 | 11.14 | 9.6 |
| 9.60 | 9.21 | 11.1 |
| 10.80 | 8.18 | 66.8 |
| 12.97 | 6.82 | 8.3 |
| 14.41 | 6.14 | 9 |
| 14.82 | 5.97 | 5.6 |
| 15.45 | 5.73 | 7.9 |
| 16.39 | 5.40 | 4.2 |
| 17.55 | 5.05 | 10.7 |
| 18.83 | 4.71 | 41.8 |
| 19.83 | 4.47 | 9.5 |
| 21.46 | 4.14 | 8 |
| 22.07 | 4.02 | 13.4 |
| 22.60 | 3.93 | 60.1 |
| 23.67 | 3.76 | 23.9 |
| 24.54 | 3.62 | 28.8 |
| 25.14 | 3.54 | 26.5 |
| 26.14 | 3.41 | 16.8 |

The characteristic data of the XRD pattern of the product after calcining in-situ and the calculated interplanar spacing data were shown in the above table.

Example 8

12.4 g of germanium oxide was dissolved in 92 g of an aqueous 1,1,3,5-TMPOH solution (20 wt %), and 1 g of Ludox-AS-40 silica sol and 4.6 g of USY zeolite ($SiO_2$/$Al_2O_3$=37). After the completion of the hydrolysis, the vessel was opened and the stirring was carried out overnight to evaporate a part of water. 28 g of an ammonium fluoride solution (37 wt %) was added, and the mixture was uniformly stirred and continued to evaporate a part of water until the reaction mixture reached the following molar composition:

0.6 (1,1,3,5-TMPOH):0.4 $SiO_2$:0.6 $GeO_2$:0.01 $Al_2O_3$:1.4 $NH_4F$:16.5$H_2O$

The above mixture was loaded into a teflon-lined crystallization autoclave, and crystallized in an oven at 185° C. for 168 hours. After the reaction, the solid was filtered, washed, dried and calcined to give a solid, an aluminum-containing molecular sieve, the XRD pattern of which was similar to that in FIG. 2, and in the product, (Si+Ge)/Al=57.

| 2θ(°) | Interplanar spacing (Å) | Relative intensity (I/I₀) × 100 |
|---|---|---|
| 6.52 | 13.55 | 43.8 |
| 6.99 | 12.63 | 100 |
| 7.99 | 11.06 | 19.3 |

-continued

| 2θ(°) | Interplanar spacing (Å) | Relative intensity (I/I₀) × 100 |
|---|---|---|
| 9.47 | 9.34 | 14.8 |
| 10.70 | 8.26 | 69 |
| 12.81 | 6.91 | 11.1 |
| 14.31 | 6.19 | 9.9 |
| 14.67 | 6.03 | 6.7 |
| 15.36 | 5.77 | 11 |
| 16.31 | 5.43 | 5.5 |
| 17.46 | 5.08 | 7.6 |
| 18.76 | 4.73 | 49 |
| 19.76 | 4.49 | 13.6 |
| 21.36 | 4.16 | 6.9 |
| 21.93 | 4.05 | 14.4 |
| 22.50 | 3.95 | 54.4 |
| 23.51 | 3.78 | 27.2 |
| 24.47 | 3.63 | 39 |
| 25.01 | 3.56 | 26.6 |
| 26.00 | 3.42 | 14.5 |

The characteristic data of the XRD pattern of the product after calcining in-situ and the calculated interplanar spacing data were shown in the above table.

Example 9

7 g of germanium oxide was dissolved in 76.8 g of an aqueous 1,1,3,5-TMPOH solution (20 wt %), and 27.8 g of tetraethyl orthosilicate (TEOS) was slowly added. After the completion of the hydrolysis, 2 g of ferric nitrate nonahydrate was added.

The vessel was opened and the stirring was carried out overnight to evaporate ethanol and a part of water. 5 g of hydrofluoric acid (40 wt %) and 30 g of an ammonium fluoride solution (37 wt %) were added, and the mixture was uniformly stirred and continued to evaporate a part of water until the reaction mixture reached the following molar composition:

0.5 (1,1,3,5-TMPOH):0.667 $SiO_2$:0.333 $GeO_2$:0.0125 $Fe_2O_3$:0.5 HF:1.5 $NH_4F$:6.6$H_2O$

The above mixture was loaded into a teflon-lined crystallization autoclave, and crystallized in an oven at 130° C. for 192 hours. After the reaction, the solid was filtered, washed, dried and calcined to give a solid, an iron-containing molecular sieve, the XRD pattern of which was similar to that in FIG. 2, and in the product, (Si+Ge)/Fe=30.

| 2θ(°) | Interplanar spacing (Å) | Relative intensity (I/I₀) × 100 |
|---|---|---|
| 6.46 | 13.68 | 31.3 |
| 6.95 | 12.71 | 100 |
| 7.75 | 11.40 | 11.2 |
| 9.46 | 9.34 | 10 |
| 10.67 | 8.29 | 67.1 |
| 12.74 | 6.94 | 6.5 |
| 14.24 | 6.22 | 7.5 |
| 14.64 | 6.04 | 5.6 |
| 15.32 | 5.78 | 7.3 |
| 16.23 | 5.46 | 2.8 |
| 17.63 | 5.03 | 3.3 |
| 18.69 | 4.74 | 33.2 |
| 19.66 | 4.51 | 7.3 |
| 21.35 | 4.16 | 8.7 |
| 21.92 | 4.05 | 11 |
| 22.43 | 3.96 | 52.1 |
| 23.50 | 3.78 | 21 |
| 24.48 | 3.63 | 31.4 |
| 25.05 | 3.55 | 25.4 |
| 26.04 | 3.42 | 16.4 |

The characteristic data of the XRD pattern of the product after calcining in-situ and the calculated interplanar spacing data were shown in the above table.

Example 10

7 g of germanium oxide was dissolved in 123 g of an aqueous 1,1,3,5-TMPOH solution (20 wt %), and 27.8 g of tetraethyl orthosilicate (TEOS) was slowly added. The mixture was uniformly stirred, and 1.7 g of tetrabutyl titanate was slowly added dropwise. The mixture was stirred at room temperature. After the completion of the hydrolysis, the vessel was opened and the stirring was carried out overnight to evaporate ethanol, butanol and a part of water. 20 g of hydrofluoric acid (40 wt %) was added, and the mixture was uniformly stirred and continued to evaporate a part of water until the reaction mixture reached the following molar composition:

0.8 (1,1,3,5-TMPOH):0.667 $SiO_2$:0.333 $GeO_2$:0.025 $TiO_2$:2 HF:12$H_2O$

The above mixture was loaded into a teflon-lined crystallization autoclave, and crystallized in an oven at 175° C. for 144 hours. After the reaction, the solid was filtered, washed, dried and calcined to give a solid, a titanium-containing molecular sieve, the XRD pattern of which was similar to that in FIG. 2, and in the product, (Si+Ge)/Ti=41.

| 2θ(°) | Interplanar spacing (Å) | Relative intensity (I/I₀) × 100 |
|---|---|---|
| 6.45 | 13.68 | 31.2 |
| 6.95 | 12.71 | 100 |
| 7.79 | 11.35 | 5.2 |
| 9.48 | 9.32 | 9.2 |
| 10.67 | 8.29 | 66 |
| 12.73 | 6.95 | 6 |
| 14.24 | 6.21 | 5.8 |
| 14.63 | 6.05 | 4.7 |
| 15.33 | 5.77 | 6.4 |
| 16.23 | 5.46 | 2.6 |
| 17.41 | 5.09 | 7.9 |
| 18.69 | 4.74 | 32.1 |
| 19.69 | 4.50 | 5.6 |
| 21.34 | 4.16 | 7.9 |
| 21.98 | 4.04 | 11 |
| 22.43 | 3.96 | 49.9 |
| 23.57 | 3.77 | 20.6 |
| 24.40 | 3.64 | 24.6 |
| 25.08 | 3.55 | 25.2 |
| 26.05 | 3.42 | 15.5 |

The characteristic data of the XRD pattern of the product after calcining in-situ and the calculated interplanar spacing data were shown in the above table.

Example 11

4 g of germanium oxide, 5 g of white carbon black and 0.145 g of boric acid were dissolved in 90.4 g of an aqueous 1,1,3,5-TMPOH solution (20 wt %), and 0.59 g of tetrabutyl titanate was slowly added dropwise. After the completion of the hydrolysis, the vessel was opened and the stirring was carried out overnight to evaporate butanol and a part of water. 23.5 g of an ammonium fluoride solution (37 wt %) was added, and the mixture was uniformly stirred and continued to evaporate a part of water until the reaction mixture reached the following molar composition:

1 (1,1,3,5-TMPOH):0.667 $SiO_2$: 0.333 $GeO_2$:0.01 $B_2O_3$: 0.015 $TiO_2$:2 $NH_4F$:9.5$H_2O$

The above mixture was loaded into a teflon-lined crystallization autoclave, and crystallized in an oven at 180° C. for 168 hours. After the reaction, the solid was filtered, washed, dried and calcined to give a solid, a boron-containing and titanium-containing molecular sieve, the XRD pattern of which was similar to that in FIG. 2, and in the product, (Si+Ge)/B=55, (Si+Ge)/Ti=60.

| 2θ(°) | Interplanar spacing (Å) | Relative intensity (I/I$_0$) × 100 |
|---|---|---|
| 6.42 | 13.75 | 46.3 |
| 6.93 | 12.75 | 100 |
| 7.92 | 11.15 | 15.1 |
| 9.45 | 9.35 | 12.8 |
| 10.66 | 8.29 | 69.6 |
| 12.74 | 6.95 | 11 |
| 14.23 | 6.22 | 10 |
| 14.64 | 6.05 | 5.1 |
| 15.31 | 5.78 | 7.5 |
| 16.21 | 5.46 | 3.5 |
| 17.35 | 5.11 | 7.7 |
| 18.68 | 4.75 | 43.4 |
| 19.72 | 4.50 | 9.8 |
| 21.39 | 4.15 | 7.2 |
| 21.89 | 4.06 | 12.1 |
| 22.43 | 3.96 | 59.8 |
| 23.57 | 3.77 | 20.5 |
| 24.47 | 3.63 | 33 |
| 25.04 | 3.55 | 29.2 |
| 25.99 | 3.43 | 16.6 |

The characteristic data of the XRD pattern of the product after calcining in-situ and the calculated interplanar spacing data were shown in the above table.

The invention claimed is:

1. A molecular sieve having an X-ray diffraction pattern as shown in the following table:

| 2θ(°) |
|---|
| 6.53 ± 0.3 |
| 7.05 ± 0.3 |
| 9.56 ± 0.3 |
| 10.77 ± 0.3 |
| 12.84 ± 0.3 |
| 18.80 ± 0.3 |
| 22.60 ± 0.3 | wherein no more than 10% of Ge atoms in the molecular sieve are substituted with atoms of at least one element other than silicon and germanium.

2. The molecular sieve of claim 1, wherein the molecular sieve is based on silicon and germanium.

3. The molecular sieve according to claim 1, wherein the molecular sieve has an X-ray diffraction pattern as shown in the following table:

| 2θ(°) | Interplanar spacing (Å) | Relative intensity (I/I$_0$) × 100 |
|---|---|---|
| 6.53 ± 0.3 | 13.53 ± 0.40 | m-s |
| 7.05 ± 0.3 | 12.53 ± 0.35 | Vs |
| 9.56 ± 0.3 | 9.24 ± 0.30 | w-m |
| 10.77 ± 0.3 | 8.21 ± 0.30 | S |
| 12.84 ± 0.3 | 6.89 ± 0.25 | w-m |
| 18.80 ± 0.3 | 4.72 ± 0.15 | m-s |
| 22.60 ± 0.3 | 3.93 ± 0.10 | m-s |
| 7.81 ± 0.3 | 11.31 ± 0.35 | W |
| 14.37 ± 0.3 | 6.16 ± 0.25 | W |
| 14.76 ± 0.3 | 6.00 ± 0.25 | W |
| 15.45 ± 0.3 | 5.73 ± 0.20 | W |
| 16.35 ± 0.3 | 5.42 ± 0.20 | W |
| 17.52 ± 0.3 | 5.06 ± 0.15 | W |
| 19.79 ± 0.3 | 4.48 ± 0.15 | W |
| 21.46 ± 0.3 | 4.14 ± 0.10 | w-m |
| 22.04 ± 0.3 | 4.03 ± 0.10 | w-m |
| 23.64 ± 0.3 | 3.76 ± 0.10 | M |
| 24.54 ± 0.3 | 3.62 ± 0.05 | M |
| 25.14 ± 0.3 | 3.54 ± 0.05 | M |
| 26.11 ± 0.3 | 3.41 ± 0.05 | w-m. |

4. The molecular sieve according to claim 1, wherein the molecular sieve has an X-ray diffraction pattern as shown in the following table:

| 2θ(°) |
|---|
| 6.53 ± 0.15 |
| 7.05 ± 0.15 |
| 9.56 ± 0.15 |
| 10.77 ± 0.15 |
| 12.84 ± 0.15 |
| 18.80 ± 0.15 |
| 22.60 ± 0.15 |
| 7.81 ± 0.15 |
| 14.37 ± 0.15 |
| 14.76 ± 0.15 |
| 15.45 ± 0.15 |
| 16.35 ± 0.15 |
| 17.52 ± 0.15 |
| 19.79 ± 0.15 |
| 21.46 ± 0.15 |
| 22.04 ± 0.15 |
| 23.64 ± 0.15 |
| 24.54 ± 0.15 |
| 25.14 ± 0.15 |
| 26.11 ± 0.15. |

5. The molecular sieve according to claim 1, wherein the molecular sieve has an X-ray diffraction pattern as shown in the following table:

| 2θ(°) | Relative intensity (I/I$_0$) × 100 |
|---|---|
| 6.53 ± 0.15 | m or s |
| 7.05 ± 0.15 | vs |
| 9.56 ± 0.15 | w or m |
| 10.77 ± 0.15 | s |
| 12.84 ± 0.15 | w or m |
| 18.80 ± 0.15 | m or s |
| 22.60 ± 0.15 | m or s |
| 7.81 ± 0.15 | w |
| 14.37 ± 0.15 | w |
| 14.76 ± 0.15 | w |
| 15.45 ± 0.15 | w |
| 16.35 ± 0.15 | w |
| 17.52 ± 0.15 | w |
| 19.79 ± 0.15 | w |
| 21.46 ± 0.15 | w or m |
| 22.04 ± 0.15 | w or m |
| 23.64 ± 0.15 | m |
| 24.54 ± 0.15 | m |
| 25.14 ± 0.15 | m |
| 26.11 ± 0.15 | w or m. |

6. The molecular sieve according to claim 1, wherein the molecular sieve has an X-ray diffraction pattern as shown in the following table:

| 2θ(°) |
| --- |
| 6.995 ± 0.200 |
| 10.730 ± 0.200 |
| 22.515 ± 0.200 |
| 6.505 ± 0.200 |
| 18.755 ± 0.200 |
| 23.585 ± 0.200 |
| 24.470 ± 0.200 |
| 25.065 ± 0.200 |
| 21.980 ± 0.200 |
| 7.870 ± 0.200 |
| 9.560 ± 0.200 |
| 12.845 ± 0.200 |
| 14.320 ± 0.200 |
| 14.725 ± 0.200 |
| 15.380 ± 0.200 |
| 16.295 ± 0.200 |
| 17.490 ± 0.200 |
| 19.745 ± 0.200 |
| 21.400 ± 0.200 |
| 26.055 ± 0.200. |

7. The molecular sieve according to claim 1, wherein the molecular sieve has an X-ray diffraction pattern as shown in the following table:

| 2θ(°) | Relative intensity |
| --- | --- |
| 6.995 ± 0.200 | vs |
| 10.730 ± 0.200 | s |
| 22.515 ± 0.200 | s |
| 6.505 ± 0.200 | m or s |
| 18.755 ± 0.200 | m or s |
| 23.585 ± 0.200 | m |
| 24.470 ± 0.200 | m |
| 25.065 ± 0.200 | m |
| 21.980 ± 0.200 | w or m |
| 7.870 ± 0.200 | w |
| 9.560 ± 0.200 | w |
| 12.845 ± 0.200 | w |
| 14.320 ± 0.200 | w |
| 14.725 ± 0.200 | w |
| 15.380 ± 0.200 | w |
| 16.295 ± 0.200 | w |
| 17.490 ± 0.200 | w |
| 19.745 ± 0.200 | w |
| 21.400 ± 0.200 | w |
| 26.055 ± 0.200 | w. |

8. The molecular sieve according to claim 1, wherein a calcined form of the molecular sieve has a framework chemical composition as represented by the formula "$SiO_2 \cdot 1/n\ GeO_2$", wherein the silicon/germanium molar ratio is $0.1 \leq n \leq 30$.

9. The molecular sieve according to claim 1, wherein the molecular sieve in form of the synthesis state has a framework chemical composition represented by the formula "$kF \cdot mQ \cdot SiO_2 \cdot 1/nGeO_2 \cdot pH_2O$", wherein the silicon/germanium molar ratio is $0.1 \leq n \leq 30$;

$0.05 \leq k \leq 1.0$;

Q is an organic template agent, $0.01 \leq m \leq 1.0$;

said organic template agent is selected from quaternary ammonium forms containing 1,1,3,5-tetraalkyl piperidinium ion or represented by the following structural formula;

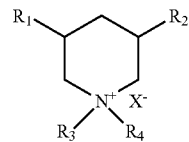

in the above formula, $R_1$-$R_4$ each independently are H or $C_{1-4}$ alkyl, $X^-$ is a halide ion or a hydroxyl ion ($OH^-$); and $0.005 \leq p \leq 0.5$.

10. The molecular sieve according to claim 1, wherein said at least one element other than silicon and germanium is at least one selected from a group consisting of boron, aluminum, gallium, titanium, zirconium, hafnium, tin, zinc, iron, chromium, and indium.

11. A process for preparing the molecular sieve of claim 1, comprising a step of crystallizing a mixture containing a silicon source, a germanium source, a fluorine source, an organic template agent Q, and water to obtain the molecular sieve, wherein said organic template agent Q is a quaternary ammonium form containing 1,1,3,5-tetraalkyl piperidinium ion or represented by the following structural formula;

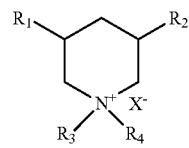

wherein $R_1$-$R_4$ each independently are H or $C_{1-4}$ alkyl, $X^-$ is a halide ion or a hydroxyl ion ($OH^-$).

12. The synthesis process of the molecular sieve according to claim 11, wherein said silicon source is at least one selected from a group consisting of water glass, silica sol, solid silica gel, fumed silica, amorphous silica, diatomite, zeolite, and tetraethyl orthosilicate; said germanium source is at least one selected from a group consisting of germanium oxide, germanium nitrate, and germanium tetraalkoxide, wherein the alkyloxy is $C_1$-$C_6$ alkyloxy; and a molar ratio of said organic template agent Q, said silicon source (as $SiO_2$), said germanium source (as $GeO_2$), said fluorine source (as F) and water is $Q:SiO_2:GeO_2:F:H_2O=0.15$-$4:1:0.033$-$10:0.2$-$4:0.5$-$50$.

13. The synthesis process of the molecular sieve according to claim 11, wherein said fluorine source comprises at least one selected from a group consisting of hydrofluoric acid, ammonium fluoride, sodium fluoride, and potassium fluoride.

14. The synthesis process of the molecular sieve according to claim 11, wherein the crystallization is carried out at 100-200° C. for 30-400 hours.

15. The synthesis process of the molecular sieve according to claim 11, wherein said mixture further comprises at least one oxide source selected from a group consisting of boron oxide source, alumina source, gallium oxide source, titania source, zirconia source, hafnia source, tin oxide source, zinc oxide source, iron oxide source, chromic oxide source, and indium oxide source;

and the molar ratio of said oxide source (as the corresponding oxide) to said germanium source (as $GeO_2$) is (0.015-0.08):1.

16. A molecular sieve composition, containing the molecular sieve according to claim 1 and a binder.

17. A method for catalytic conversion of an organic compound, comprising contacting the organic compound with a catalyst comprising the molecular sieve according to claim 1.

18. A molecular sieve composition, containing a molecular sieve prepared with the synthesis process of the molecular sieve according to claim 11 and a binder.

19. An adsorbent comprising the molecular sieve according to claim 1.

* * * * *